US012759713B2

(12) United States Patent
Al-Husseini

(10) Patent No.: US 12,759,713 B2
(45) Date of Patent: Oct. 13, 2026

(54) SYSTEM AND METHOD FOR AUTHENTICATING AND VISUALIZING PHASES OF A JUMPMASTER PERSONNEL INSPECTION PROCESS

(71) Applicant: U.S. Army DEVCOM, Army Research Laboratory, Adelphi, MD (US)

(72) Inventor: Mahdi Al-Husseini, Enterprise, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 108 days.

(21) Appl. No.: 18/794,000

(22) Filed: Aug. 5, 2024

(65) Prior Publication Data

US 2026/0070663 A1 Mar. 12, 2026

(51) Int. Cl.
*B64D 21/00* (2006.01)
*G08B 5/36* (2006.01)

(52) U.S. Cl.
CPC ............... *B64D 21/00* (2013.01); *G08B 5/36* (2013.01)

(58) Field of Classification Search
CPC ................................ B64D 21/00; B64D 23/00
See application file for complete search history.

(56) References Cited

U.S. PATENT DOCUMENTS 9,522,743 B1 * 12/2016 Tolani ...................... G01D 9/28

* cited by examiner

*Primary Examiner* — Benyam Haile
(74) *Attorney, Agent, or Firm* — Alan I. Kalb

(57) ABSTRACT

Systems, methods and apparatus configured for optimizing a JMPI process introducing an easily visible worn device with an interactive authentication mechanism, illustratively, a keypad for entering a jumpmaster code or a fingerprint authentication device for obtaining a jumpmaster fingerprint. Following the completion of a JMPI, the jumpmaster signs their inspection with the code or fingerprint on a student's device for record keeping. Once recorded, in some embodiments a green LED, one of two, is illuminated. The process repeats for a second JMPI and a second green LED is illuminated. The two illuminated LEDs on a parachutist's wearable indicate to the jumpmaster that the parachutist has been inspected twice and may continue to jump. Each wearable is connected via wired or wireless means to a computing device in the manifest office, where records of each JMPI are kept, and where the JMPI status of each lift may be visualized.

4 Claims, 4 Drawing Sheets

300

400

SYSTEM AND METHOD FOR AUTHENTICATING AND VISUALIZING PHASES OF A JUMPMASTER PERSONNEL INSPECTION PROCESS

GOVERNMENT INTEREST

The invention described herein may be manufactured and used by or for the Government of the United States for all governmental purposes without the payment of any royalty.

FIELD OF THE DISCLOSURE

The present disclosure relates generally to jumpmaster personnel inspections (JMPIs), and more particularly to an electronic device worn by a parachutist that authenticates and visualizes the potentially multi-step JMPI process.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Army jumpmasters are experienced parachutists whose additional training qualifies them to serve in a variety of roles supporting parachuting operations. Those roles include pre-jump inspections, parachuting instruction, in-flight navigation, tasks essential to overall operation safety, and control of the aircraft exit. Army jumpmasters support both static-line and free fall operations, though the proposed invention will be discussed using primarily free fall operations for context.

Of particular interest here is in the pre-jump inspection; officially known as the jumpmaster personnel inspection or JMPI. Though requirements may vary based on unit, as demonstrated at the US Army Free Fall School, a free fall parachutist must be inspected twice, and the parachutist must document the names of those two jumpmasters in case a preventable equipment malfunction later occurs. Typically, a paper roster is printed for each jump that is filled in by the parachutist. The parachutist must remember the names of the jumpmasters who completed the inspection prior to each jump, and each of those rosters must be maintained for reference. A parachutist who has not been successfully inspected twice is not allowed to jump; a jumpmaster will typically question the parachutist regarding the status of his two JMPIs prior to permitting aircraft boarding. This process is cumbersome.

SUMMARY OF THE INVENTION

Various deficiencies in the prior art are addressed below by the disclosed systems, methods and apparatus configured for optimizing a JMPI process introducing an easily visible worn device with an interactive authentication mechanism, illustratively, a keypad for entering a jumpmaster code or a fingerprint authentication device for obtaining a jumpmaster fingerprint. Following the completion of a JMPI, the jumpmaster signs their inspection with the code or fingerprint on a student's device for record keeping. Once recorded, in some embodiments a green LED, one of two, is illuminated. The process repeats for a second JMPI and a second green LED is illuminated. The two illuminated LEDs on a parachutist's wearable indicate to the jumpmaster that the parachutist has been inspected twice and may continue to jump. Each wearable is connected via wired or wireless means to a computing device in the manifest office, where records of each JMPI are kept, and where the JMPI status of each lift may be visualized.

According to an embodiment, an inspection authentication apparatus is configured to be worn by a parachutist for authenticating and visualizing phases of a jumpmaster personnel inspection process, the apparatus comprising: a display indicator; an interactive authentication mechanism; and a processor configured to execute instructions stored in a non-transitory memory to perform thereby a method comprising: receiving first jumpmaster authentication data via the interactive authentication mechanism and, if the first jumpmaster authentication data is determined to be valid, illuminating a first display indicator; and receiving second jumpmaster authentication data via the interactive authentication mechanism and, if the second jumpmaster authentication data is determined to be valid, illuminating a second display indicator.

According to an embodiment, a method for authenticating and visualizing various phases of a jumpmaster personnel inspection process using a parachutist-wearable authentication device (AD) comprises, at the AD, receiving first jumpmaster authentication data via the interactive authentication mechanism and, if the first jumpmaster authentication data is determined to be valid, illuminating a first display indicator; and receiving second jumpmaster authentication data via the interactive authentication mechanism and, if the second jumpmaster authentication data is determined to be valid, illuminating a second display indicator.

According to an embodiment, a system for documenting and visualizing various phases of the jumpmaster personnel inspection process for a lift of parachutists comprises, for each parachutist, a respective wearable authenticator device (AD) configured for communicating with a manifest computer via a wireless network; each AD comprising a display indicator, an interactive authentication mechanism, a communications transceiver, and a processor configured to execute instructions stored in a non-transitory memory to perform thereby a method comprising receiving first jumpmaster authentication data via the interactive authentication mechanism and, if the first jumpmaster authentication data is determined to be valid, illuminating a first display indicator; receiving second jumpmaster authentication data via the interactive authentication mechanism and, if the second jumpmaster authentication data is determined to be valid, illuminating a second display indicator; and transmitting JMPI status information toward the manifest computer; the manifest computer being configured to process received JMPI status information and responsively visualize JMPI status of all parachutists for a current lift in real-time.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1A:
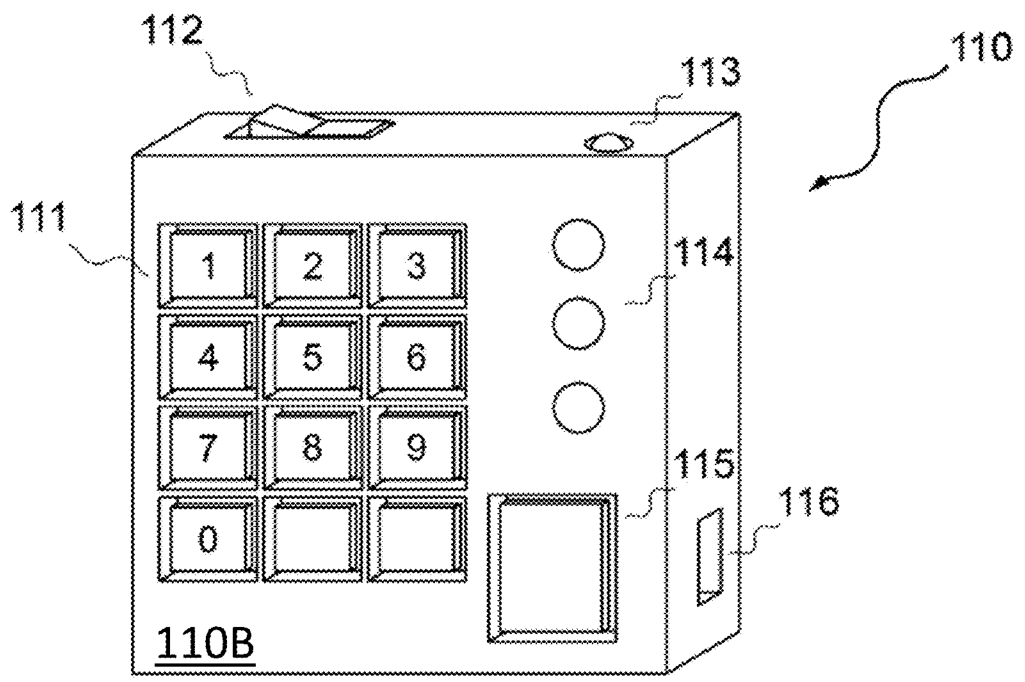
FIGS. 1A-1B illustrate respective embodiments of jumpmaster personnel inspection (JMPI) authenticator devices.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments, such as seismology and data fusion.

Various embodiments are directed to optimizing the JMPI process for each parachutist by augmenting the process via technical means; illustratively, introducing an easily visible worn device with an interactive authentication mechanism, illustratively, a keypad for entering a jumpmaster code or a fingerprint authentication device for obtaining a jumpmaster fingerprint. Following the completion of a JMPI, the jumpmaster signs their inspection with the code or fingerprint on a student's device for record keeping. Once recorded, in some embodiments a green LED, one of two, is illuminated. The process repeats for a second JMPI and a second green LED is illuminated. The two illuminated LEDs on a parachutist's wearable indicate to the jumpmaster that the student has been inspected twice and may continue to jump. Each wearable is connected via wired or wireless means to a computing device in the manifest office, where records of each JMPI are kept, and where the JMPI status of each lift may be visualized.

Much as each passcode is attributed to a jumpmaster, each fingerprint is attributed to a jumpmaster, and a database of fingerprint records can help translate recordkeeping at the manifest office.

Figure 1B:
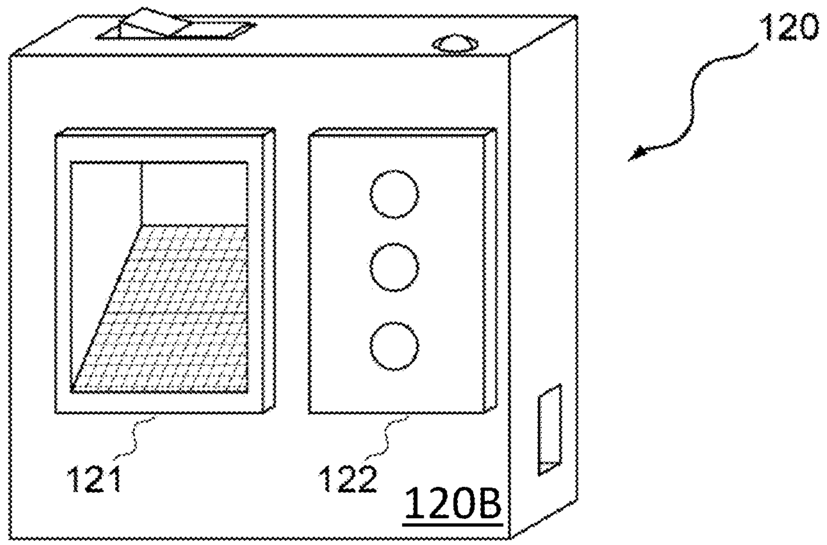

FIGS. 1A-1B illustrate respective embodiments of jumpmaster personnel inspection (JMPI) authenticator devices. Each of the wearable JMPI authenticator devices are configured to be worn on the outside of rigged gear of a parachutist. The wearable may be worn anywhere on the parachutist's body or worn gear that is easily accessible on the ground, preferably where there is little or no possibility of a snag hazard in air during canopy deployment. One recommended location is attached to the parachutist's vest, which provides a central location for the jumpmaster to see and actuate the wearable. A parachutist's vest often contains accessories to include an SMS, radio, headset push to talk cables, and more, and the addition of the proposed invention would not be out of place.

Each of the wearable JMPI authenticator devices includes an interactive authentication mechanism via which a jumpmaster inspecting a parachutist may be authenticated when affirming the conclusion of an inspection or inspection step, and a display device for visually indicating the completion of that inspection or inspection step (i.e., visualizing a current status of the JMPI process).

FIG. 1A depicts a first wearable JMPI authenticator device 110 for authenticating and visualizing the JMPI process. The first wearable authenticator device 110 features a keypad entry authentication mechanism 111 with enter button 115, light emitting diode (LED) array 114, power switch 112, battery LED 113, and digital access port 116. As depicted in FIG. 1A, each of these features is recessed into an outer body or container 110B of the first wearable authenticator device 110 to minimize unintended actuation by other worn equipment.

FIG. 1B depicts a second wearable JMPI authenticator device 120 for authenticating and visualizing the JMPI process. The second wearable authenticator device 120 includes features similar to that of the first wearable authenticator device 110, except that the keypad entry authentication mechanism 111 is replaced by a fingerprint authentication mechanism 121. An advantage of fingerprint authentication is that unauthorized entry is effectively minimized, whereas knowledge of a jumpmaster's passcode is enough to record a JMPI as completed using the keypad entry authentication mechanism 111. As depicted in FIG. 1B, each of these features is recessed into an outer body or container 120B of the second wearable authenticator device 120 to minimize unintended actuation by other worn equipment.

Figure 2:
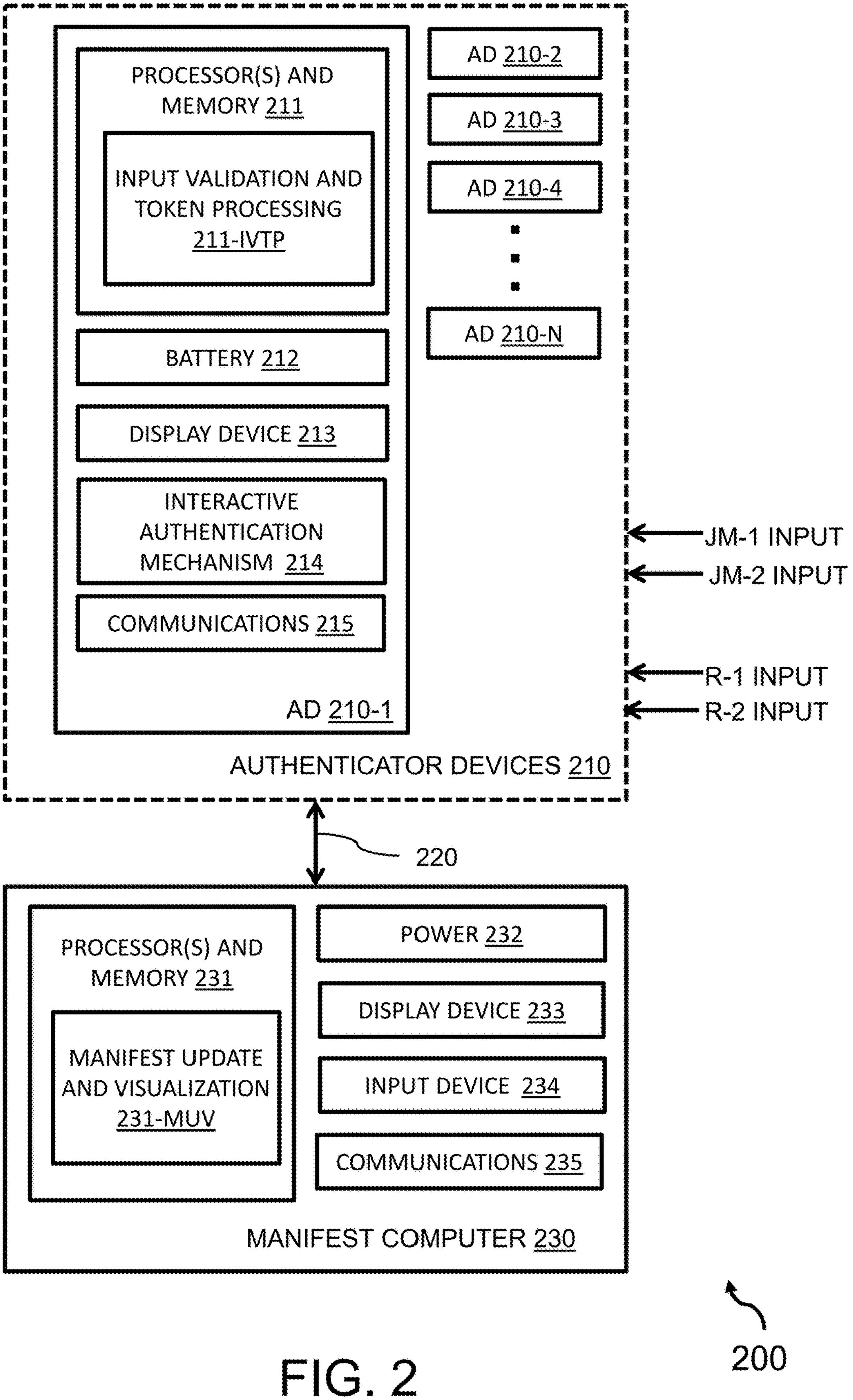
FIG. 2 depicts a block diagram of a system including JMPI authenticator devices according to an embodiment.

FIG. 2 depicts a block diagram of a system including JMPI authenticator devices according to an embodiment. Specifically, the system 200 comprises one or more JMPI authenticator devices (ADs) 210, illustratively one AD for each of the parachutists in a stick or group of sticks embarking on a jump. Each of the ADs 210 is configured to receive input from a first jumpmaster JM-1 and a second jumpmaster JM-2. In some embodiments, one or more of the ADs 210 communicates with a manifest computer 230 via a wireless channel or communications link 120.

Generally speaking, each of the least one AD 210 is configured to accept jumpmaster input data, authenticate the jumpmaster providing the input data, and visually indicate a status or completed step(s) a jumpmaster personnel inspection (JMPI) for the parachutist associated with the AD.

As depicted in FIG. 2, each of the least one AD 210 comprises portable electronic device configured to be worn by a parachutist and accessed by a jumpmaster inspecting the equipment of the parachutist as part of a JMPI, such as discussed above and with respect to FIG. 1. The AD 210 comprises various modules/elements including one or more processors with memory 211 (e.g., a computing device), battery 212, display device 213, interactive authentication mechanism 214, and communications transceiver 215.

The one or more processors with memory 211 may comprise processing resources such as processor and/or logic circuitry capable of processing digital information such as ASICs, GPUs, DPUs, and the like, as well memory resources such as volatile and/or non-volatile memory capable of storing data and computing instructions such as ROM, EPROM, EEPROM, flash memory, DRAM, and the like. Generally speaking, the processor/memory 211 includes processing resources configured to retrieve and execute programming instructions stored in memory resources such that the processor/memory 211 performs various functions as described herein with respect to the embodiments.

The embodiment of the at least one AD 210 depicted in FIG. 2 shows a processor/memory 211 having loaded within the memory computer instructions associated with an input validation and token processing routine or module 211-IVTP, which instructions when executed by the processor(s) will perform various functions as discussed herein. While not depicted in FIG. 2, it is noted that other or additional processing routines or modules may also be loaded in the memory of processor/memory 211 for execution by the processor(s) of processor/memory 211 to perform various to perform various other or additional functions as discussed herein.

Battery 212 may be an internal battery whose electrical specifications are designed to support various components of the AD 210.

Communications transceiver 215 may comprise one or more transceivers capable of receiving and transmitting data across a wireless communication network 220. The wireless communication network 220 may include, for example, a wireless local area network (WLAN), wireless personal area network (WPAN), wireless metropolitan area network (WMAN), wireless wide area network (WWAN), satellite-based networks, Bluetooth, or any combination thereof. Wireless communication network 220 allows AD 210 to transmit, illustratively, JMPI data associated with the parachutists to the manifest computer 230 for storage/processing thereat.

Interactive authentication mechanism 214 may be a keypad 111, a biometric authentication mechanism such as a fingerprint authentication mechanism 121. Other biometric authentication mechanisms may include retina/iris recognition, facial recognition, or voice recognition. Further, certificate-based authentication may be used, such as a Common Access Card (CAC) reader. Regardless of the selected mechanism, the AD has stored in its memory data configured to link the authenticated jumpmaster to the wearer of the AD. Much as each passcode is attributed to a jumpmaster, each fingerprint is attributed to a jumpmaster, and a database of fingerprint records can help translate recordkeeping at the manifest office.

Generally speaking, the various embodiments receive input from a jumpmaster including JMPI data and authentication data; the authentication data is validated using, for example, an access token or other credential associated with the jumpmaster such as an access code that can be entered via a keyboard, biometric data such as a fingerprint, and so on. If authenticated, the JMPI data is then accepted for use by the AD.

Power switch 112 must be easily, but not accidentally actuated, and may be a push button, rocker switch, or similar. Outward facing display indicator 213, 114, or 122 may be an LED array, OLED display, LCD display, or similar, so long as there is clear visibility to jumpmasters and others regarding a parachutist's progress through the JMPI process.

As depicted in FIG. 2, the manifest computer 230 comprises various modules/elements including one or more processors with memory 231 (e.g., a computing device), power module 232, display device 233, input device 234, and communications transceiver 235.

The embodiment of the manifest computer 230 depicted in FIG. 2 shows a processor/memory 231 having loaded within the memory computer instructions associated with a manifest update and visualization routine or module 231-MUV, which instructions when executed by the processor(s) will perform various functions as discussed herein, such as updating inspection status (JMPI and/or parachute inspection) in real time for all parachutists in a stick or lift being inspected, tracking changes related to such inspections (i.e., number of failures/problems per parachutist, or group or parachutists), visualizing the updated inspection status in real time for all parachutists in a stick or lift being inspected, updating/visualizing historic inspections data, and performing various other functions for management purposes.

While not depicted in FIG. 2, it is noted that other or additional processing routines or modules may also be loaded in the memory of processor/memory 231 for execution by the processor(s) of processor/memory 231 to perform various other or additional functions as discussed herein.

Data transmitted from the ADs 210 to the manifest computer 230 may include each parachutist's information, the status of the parachutist through the JMPI process, and the name of each jumpmaster who conducted a JMPI on the parachutist.

The JMPI process is a "worn" inspection process; that is, inspection of a fully rigged and ready to go parachutist to ensure that the parachutist is correctly wearing all necessary gear prior to a jump. The various embodiments described herein with respect to the JMPI process are therefore directed to providing technical augmentation to the process of worn gear inspection.

In some embodiments, the JMPI authentication device 210 is used for parachute inspections as well, which is a process separate from or prior to the worn gear inspection. Specifically, various embodiments provide technical augmentation to the process of parachute packing/inspection, which process occurs prior to JMPI and includes the steps of: (1) each parachutist packs his/her own parachute; (2) a first rigger (not jumpmaster) inspecting the packed parachute and signing off on a card in the parachute; (3) a second rigger reinspecting the packed parachute and signing off on the same card in the parachute.

Figure 4:
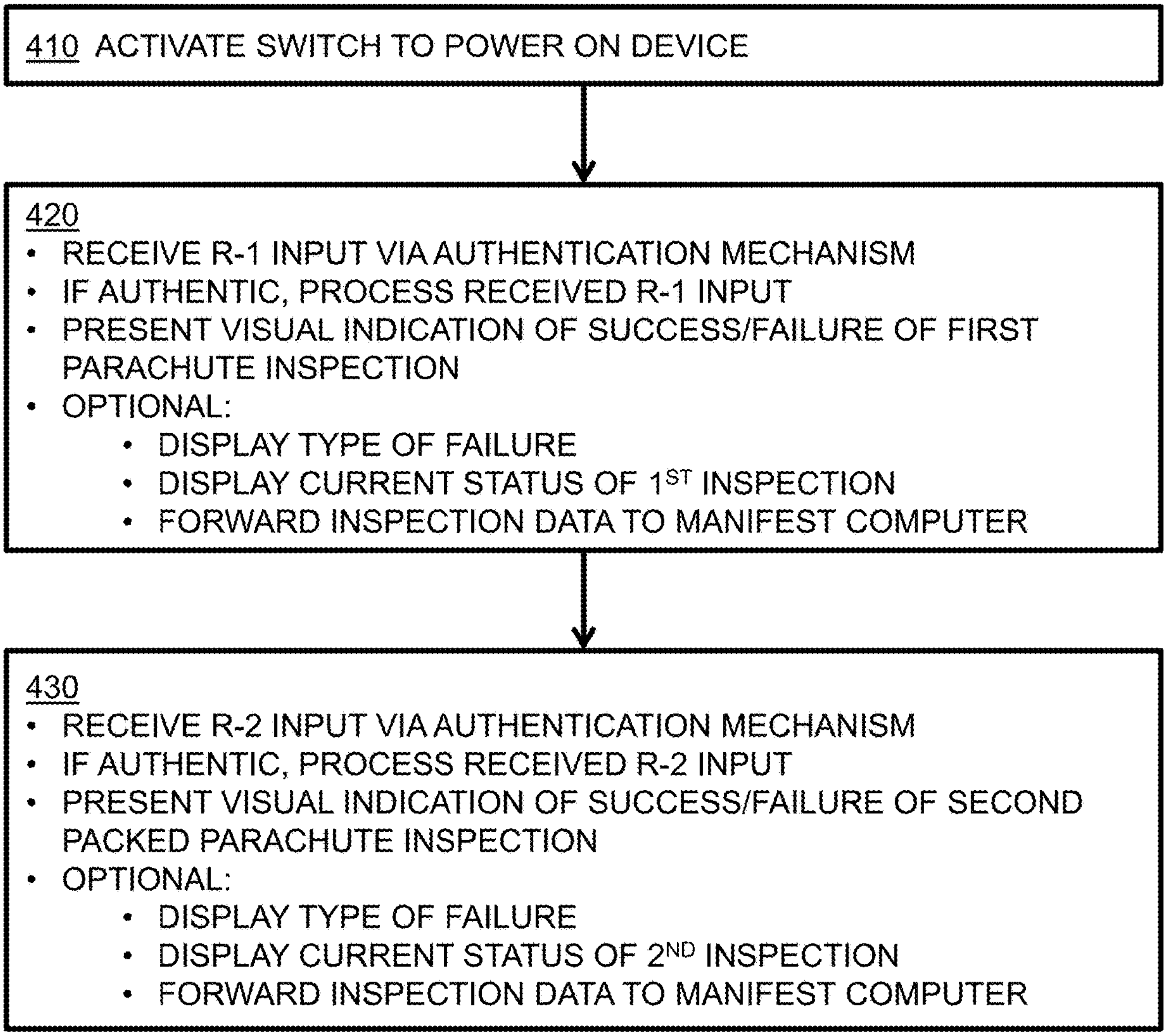
FIG. 4 depicts a flow diagram of a parachute rigger authentication process using the JMPI authenticator devices/methods such as in FIGS. 1-3.

Thus, in parachute packing/inspection embodiments, each of the ADs 210 is configured to receive input from a first rigger R-1 and a second rigger R-2, to authenticate inspecting riggers (not jumpmasters) providing input thereto, and to visually indicate that a particular packed parachute has passed or failed the rigger inspections as described in FIG. 4.

It is noted that parachute inspection data may also be provided to the manifest computer 230 by the AD 210, where the inspection data associated with a particular parachute follows that parachute rather than the jumper wearing the parachute at the time of parachute inspection. Thus, various embodiments provide a new safety mechanism for replacing an old analog system. That parachutist typically maintains the same parachute throughout the jump (and future jumps), so that they are uniquely coupled. If for whatever reason the parachutists are swapped around between jumps, then the parachute inspection data is associated with the parachute and transferred to a new parachutes along with the parachute itself. The JMPI authentication device 210 may be connected to a parachutist's worn gear, such to a vest via webbing attachment links.

Although primarily depicted and described as having specific types and arrangements of components, it will be appreciated that any other suitable types and/or arrangements of components may be used for AD 210, wireless communications channel, link, or network 220, manifest computer 230, and/or any portions thereof.

Specifically, various elements or portions thereof depicted in FIG. 2 and having functions described herein are implemented at least in part as computing devices having communications capabilities, including in support of the AD 210, wireless communications channel, link, or network 220, manifest computer 230, and/or any portions thereof. These elements or portions thereof have computing devices of various types, though generally a processor element (e.g., a central processing unit (CPU) or other suitable processor (s)), a memory (e.g., random access memory (RAM), read only memory (ROM), and the like), various communications interfaces (e.g., more interfaces enabling communications via different networks/RATs), input/output interfaces (e.g., GUI delivery mechanism, user input reception mechanism, web portal interacting with remote workstations and so on) and the like.

For example, various embodiments are implemented using computing and/or networking equipment used to implement various functions, the equipment comprising processing resources (e.g., one or more servers, processors and/or virtualized processing elements or compute resources) and non-transitory memory resources (e.g., one or more storage devices, memories and/or virtualized memory elements or storage resources), wherein the processing resources are configured to execute software instructions stored in the non-transitory memory resources to implement thereby the various methods and processes described herein. The computing and/or networking equipment may also be used to provide some or all of the various other core network nodes or functions described herein.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus, various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory or stored within a memory within a computing device operating according to the instructions.

Figure 3:
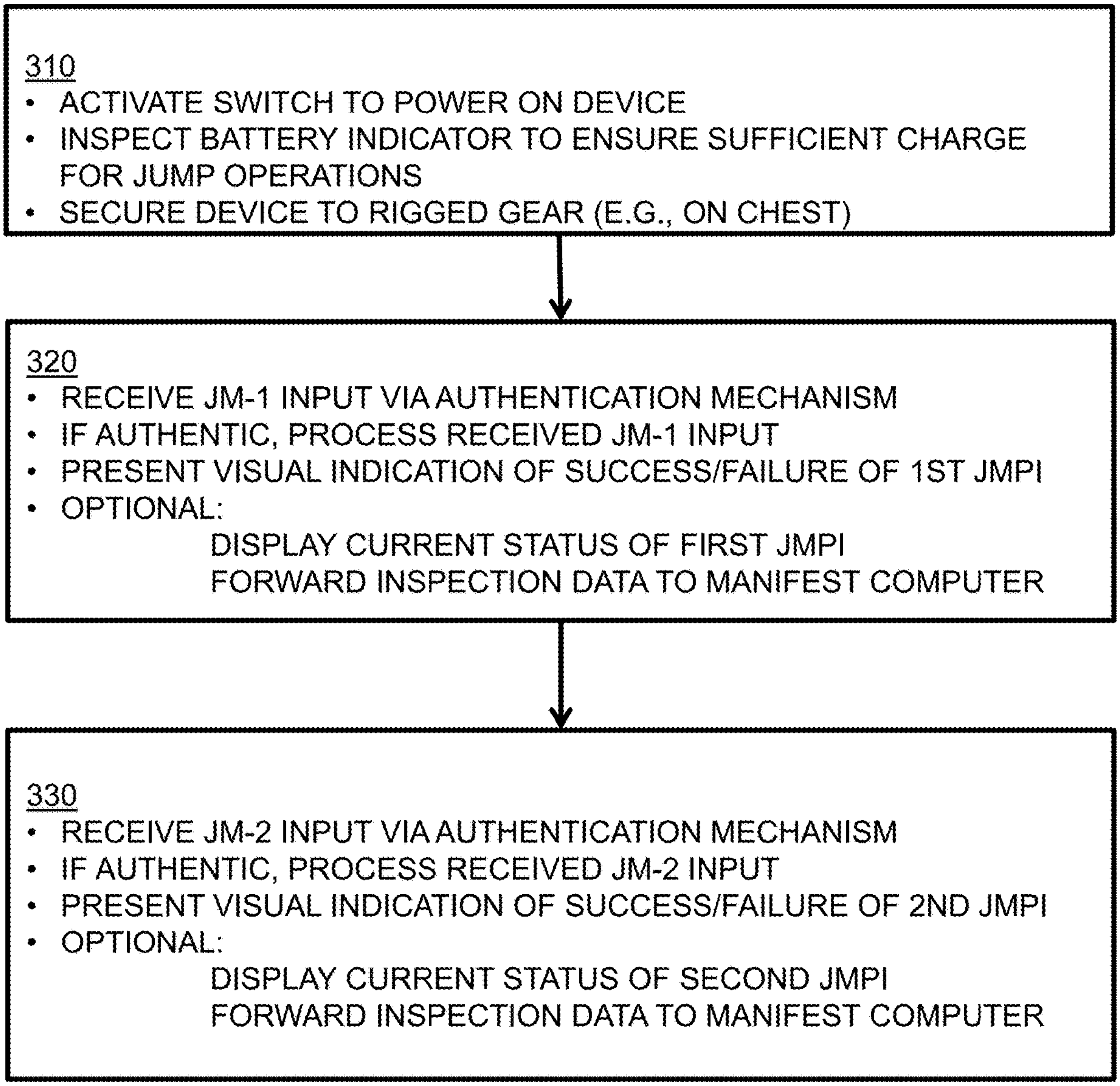
FIG. 3 depicts a flow diagram of a JMPI authentication process using the JMPI authenticator devices such as in FIGS. 1-2.

FIG. 3 depicts a flow diagram of a JMPI authentication process using the JMPI authenticator devices such as in FIGS. 1-2.

At step 310, a power switch 112 on the AD is actuated 301 to power on the device prior to the JMPI process, a battery LED 113 may be inspected per to ensure sufficient charge for jump operations, with different colors reflecting the various levels of battery charge. The AD is secured to the rigged gear of the parachutist (e.g., on the chest gear).

At step 320, input from a first jumpmaster is received via an authentication mechanism and processed if valid. For embodiments of the AD using a keypad authentication mechanism 111, each jumpmaster is associated with a unique keypad passcode that may be entered into the keypad authentication mechanism 111 to record the successful completion of the first JMPI. For embodiments of the AD using a biometric authentication mechanisms such as a fingerprint authentication mechanism, the input from the first jumpmaster jump includes appropriate biometric input (e.g., fingerprint retrieved via a fingerprint scanner 121) to record the successful completion of the first JMPI.

If the first JMPI is successful, then a visual indication is presented via the display device of the AD, such as by illumination of a first green LED in LED array 114. Optionally, a key in 111 may be used to identify that there was a failed inspection due to a particular type of failure (e.g., misrouting or incorrect wear of equipment), an indication of the failure or status of the first inspection (e.g., presentation of a visual indication of such by illuminating a red LED in LED array 114), and/or a forwarding of inspection data to the manifest computer.

At step 330, input from a second jumpmaster is received via an authentication mechanism and processed if valid. For embodiments of the AD using a keypad authentication mechanism 111, each jumpmaster is associated with a unique keypad passcode that may be entered into the keypad authentication mechanism 111 to record the successful completion of the second JMPI. For embodiments of the AD using a biometric authentication mechanisms such as a fingerprint authentication mechanism, the input from the second jumpmaster jump includes appropriate biometric input (e.g., fingerprint retrieved via a fingerprint scanner 121) to record the successful completion of the second JMPI.

If the second JMPI is successful, then a visual indication is presented via the display device of the AD, such as by illumination of a second single green LED in LED array 114. Optionally, a key in 111 may be used to identify that there was a failed inspection due to a particular type of failure (e.g., misrouting or incorrect wear of equipment), an indication of the failure or status of the first inspection (e.g., presentation of a visual indication of such by illuminating a red LED in LED array 114), and/or a forwarding of inspection data to the manifest computer.

FIG. 4 depicts a flow diagram of a parachute rigger authentication process using the JMPI authenticator devices/methods such as in FIGS. 1-3.

At step 410, a power switch 112 on the AD is actuated 301 to power on the device prior to the parachute inspection process.

At step 420, input from a first rigger is received via an authentication mechanism and processed in substantially the same manner as described above with respect to first jumpmaster input processing at step 320 of the method 300 of FIG. 3.

If the first parachute inspection is successful, then a visual indication is presented via the display device of the AD, such as by illumination of a first green LED in LED array 114. Optionally, a key in 111 may be used to identify that there was a failed inspection due to a particular type of failure, an indication of the failure or status of the first inspection (e.g., presentation of a visual indication of such by illuminating a red LED in LED array 114), and/or a forwarding of inspection data to the manifest computer.

At step 430, input from a first rigger is received via an authentication mechanism and processed in substantially the same manner as described above with respect to first jumpmaster input processing at step 330 of the method 300 of FIG. 3.

If the second JMPI is successful, then a visual indication is presented via the display device of the AD, such as by illumination of a second single green LED in LED array 114. Optionally, a key in 111 may be used to identify that there was a failed inspection due to a particular type of failure, an indication of the failure or status of the first inspection (e.g., presentation of a visual indication of such by illuminating a red LED in LED array 114), and/or a forwarding of inspection data to the manifest computer.

In the apparatus and methods described herein and above, validation of authentication input from an authentication mechanisms may comprise determining if at least one of an entered access code, retina scan, facial recognition, voice recognition, and/or fingerprint is valid or matches that of a jumpmaster or parachute inspector, such as one that is present for the inspection.

Various embodiments provide an inspection authentication apparatus configured to be worn by a parachutist for authenticating and visualizing phases of a jumpmaster personnel inspection process, the apparatus comprising: an outward facing display indicator; and an interactive authentication mechanism; and memory; and a processor, the processor configured to: accept inputs from one or more jumpmasters via the interactive authentication mechanism; validate the inputs against an internal database of accepted tokens stored in memory; illuminate the outward facing display indicator in accordance with the results of the validation of inputs. The wearable may further contain a transceiver for data transmission over a communication network to a manifest computer, for the purpose of updating a manifest office on the JMPI status of all parachutists on a particular lift in real-time. The outward facing display indicator may be a digital display or LED array. The wearable may further contain one or more attachment straps for connection to the parachutist or worn parachutist equipment. The interactive authentication mechanism may be a keypad or biometric sensor. The wearable may further contain a switch for powering the wearable on/off. The outward facing display indicator may also indicate battery life remaining.

Various embodiments provide a method for authenticating and visualizing various phases of a jumpmaster personnel inspection process using a wearable, the method comprising: actuating a switch to ensure the wearable is powered on; inspecting a battery indicator to ensure the wearable is sufficiently charged; having a first jumpmaster authenticate the wearable using an interactive authentication mechanism following successful completion of a first JMPI; illuminating an outward facing display indicator to indicate the successful completion of the first JMPI; having a second jumpmaster authenticate the wearable using the interactive authentication mechanism following successful completion of a second JMPI; illuminating the outward facing display indicator to indicate the successful completion of the second JMPI. The first jumpmaster authentication may occur by comparing the first jumpmaster's input to the interactive authentication mechanism against an internal database of accepted tokens stored in memory. The second jumpmaster authentication may occur by comparing the second jumpmaster's input to the interactive authentication mechanism against an internal database of accepted tokens stored in memory. The interactive authentication mechanism may be a keypad or biometric sensor. The outward facing display indicator may be a digital display or LED array. The battery indicator may be part of the outward facing display indicator.

Various embodiments provide a system for documenting and visualizing various phases of the jumpmaster personnel inspection process for a lift of parachutists, the system, comprising: one or more wearables for authenticating and visualizing various phases of the jumpmaster personnel inspection process, each wearable specific to a particular parachutist in the lift; and a communication network; and a computing device in the manifest office.

Various embodiments provide a method for documenting and visualizing various phases of the jumpmaster personnel inspection process for a lift of parachutists, the method, comprising: authenticating one or more JMPIs received by each parachutist in the lift using a wearable specific to that parachutist; transmitting the status of one or more JMPIs from the wearable to a computing device in the manifest office via a communication network; aggregating the status of all JMPIs across all parachutists in the lift on the computing device in the manifest office; and visualizing the status of the aggregated JMPIs on the computing device in the manifest status.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. An inspection authentication apparatus configured to be worn by a parachutist for authenticating and visualizing phases of a jumpmaster personnel inspection process, the apparatus comprising:

a display indicator;

an interactive authentication mechanism comprising a biometric sensor; and a processor configured to execute instructions stored in a non-transitory memory to perform thereby a method comprising:

receiving first jumpmaster authentication data, comprising a valid fingerprint, via the biometric sensor and, if the first jumpmaster authentication data is determined to be valid, illuminating a first display indicator; and receiving second jumpmaster authentication data, comprising a valid fingerprint, via the biometric sensor and, if the second jumpmaster authentication data is determined to be valid, illuminating a second display indicator.

2. The apparatus of claim 1, wherein the biometric sensor is further configured to receive authentication data comprising at least one of a valid retina scan, facial recognition, and voice recognition.

3. A method for authenticating and visualizing various phases of a jumpmaster personnel inspection process using a parachutist-wearable authentication device (AD), the method comprising:

at the AD, receiving first jumpmaster authentication data via an interactive authentication mechanism comprising a biometric sensor, wherein the authentication data comprises a valid fingerprint and, if the first jumpmaster authentication data is determined to be valid, illuminating a first display indicator; and receiving second jumpmaster authentication data via the biometric sensor, wherein the authentication data comprises a valid fingerprint and, if the second jumpmaster authentication data is determined to be valid, illuminating a second display indicator.

4. A system for documenting and visualizing various phases of the jumpmaster personnel inspection process for a lift of parachutists, the system comprising:

for each parachutist, a respective wearable authenticator device (AD) configured for communicating with a manifest computer via a wireless network;

each AD comprising a display indicator, an interactive authentication mechanism comprising a biometric sensor, a communications transceiver, and a processor configured to execute instructions stored in a non-transitory memory to perform thereby a method comprising:

receiving first jumpmaster authentication data, comprising a valid fingerprint, via the biometric sensor and, if the first jumpmaster authentication data is determined to be valid, illuminating a first display indicator;

receiving second jumpmaster authentication data, comprising a valid fingerprint, via the biometric sensor and, if the second jumpmaster authentication data is determined to be valid, illuminating a second display indicator; and transmitting JMPI status information toward the manifest computer;

the manifest computer being configured to process received JMPI status information and responsively visualize JMPI status of all parachutists for a current lift in real-time.

* * * * *